(12) United States Patent
Gonze et al.

(10) Patent No.: US 8,528,323 B2
(45) Date of Patent: Sep. 10, 2013

(54) SYSTEM AND METHOD FOR PARTICULATE MATTER FILTER REGENERATION USING A CATALYTIC CONVERTER AS A COMBUSTOR

(75) Inventors: Eugene V. Gonze, Pinckney, MI (US); Halim G. Santoso, Novi, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 380 days.

(21) Appl. No.: 12/827,047

(22) Filed: Jun. 30, 2010

(65) Prior Publication Data

US 2012/0000180 A1    Jan. 5, 2012

(51) Int. Cl.
*F01N 3/02* (2006.01)
*F01N 3/20* (2006.01)

(52) U.S. Cl.
USPC ............. 60/289; 60/274; 60/286; 60/297; 60/295; 60/311

(58) Field of Classification Search
USPC ............. 60/274, 285, 289, 295, 297, 311
See application file for complete search history.

(56) References Cited

U.S. PATENT DOCUMENTS

| 5,085,049 | A * | 2/1992 | Rim et al. | 60/274 |
|---|---|---|---|---|
| 5,251,564 | A * | 10/1993 | Rim et al. | 110/344 |
| 6,644,020 | B2 * | 11/2003 | Kuenstler et al. | 60/286 |
| 6,969,413 | B2 * | 11/2005 | Yahata et al. | 55/282.3 |
| 7,104,051 | B2 * | 9/2006 | Shimasaki et al. | 60/297 |
| 7,107,764 | B1 * | 9/2006 | Opris et al. | 60/297 |
| 7,490,462 | B2 * | 2/2009 | Roozenboom et al. | 60/278 |
| 7,836,685 | B2 * | 11/2010 | Yokoi et al. | 60/295 |
| 7,937,935 | B2 * | 5/2011 | Williams et al. | 60/295 |
| 2003/0230060 | A1 * | 12/2003 | Yahata et al. | 55/282.3 |
| 2009/0188243 | A1 * | 7/2009 | Williams et al. | 60/295 |
| 2011/0023467 | A1 * | 2/2011 | Kong et al. | 60/287 |
| 2011/0072788 | A1 * | 3/2011 | Ruona et al. | 60/276 |
| 2011/0146267 | A1 * | 6/2011 | Hepburn et al. | 60/602 |
| 2011/0146268 | A1 * | 6/2011 | Hepburn et al. | 60/602 |
| 2011/0146269 | A1 * | 6/2011 | Hepburn et al. | 60/602 |

OTHER PUBLICATIONS

U.S. Appl. No. 12/397,798, filed Mar. 4, 2009, Brown et al.

* cited by examiner

*Primary Examiner* — Kenneth Bomberg
*Assistant Examiner* — Dapinder Singh

(57) ABSTRACT

A control system for an engine includes an exhaust module and a combustion module. The exhaust module supplies a first MAF to exhaust produced by the engine upstream of a catalytic converter during regeneration of a PM filter located downstream of the catalytic converter. The combustion module, during the regeneration, supplies a first amount of fuel to a cylinder during an intake stroke based on the first MAF and a second MAF to the cylinder during the intake stroke. The combustion module, during the regeneration, further supplies a second amount of fuel to the cylinder during a subsequent intake stroke based on a first A/F ratio of the cylinder and an oxygen content of the exhaust downstream of the catalytic converter. A method for controlling an engine during regeneration of the PM filter is also provided.

21 Claims, 4 Drawing Sheets

SYSTEM AND METHOD FOR PARTICULATE MATTER FILTER REGENERATION USING A CATALYTIC CONVERTER AS A COMBUSTOR

FIELD

The present disclosure relates to vehicle exhaust treatment systems, and more particularly, to control systems and methods for regenerating particulate matter filters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines used to power a vehicle combust fuel in the presence of air to produce power. The combustion of the fuel produces exhaust that contains various gases and particulate matter (PM). The exhaust may be treated in an exhaust system to reduce concentrations of certain constituent gases and the PM. For example, a catalytic converter may reduce the concentration of gases such as carbon monoxide (CO) and nitrogen oxides ($NO_X$). The catalytic converter may also reduce the concentration of hydrocarbons (HC) composed of unburned or partially burned fuel. Additionally, the PM may be filtered from the exhaust by a PM filter.

Over time, PM filtered from the exhaust accumulates within the PM filter and begins to restrict the flow of exhaust through the PM filter. PM that has accumulated within the PM filter may be removed by a process referred to as regeneration. During regeneration, PM within the PM filter is combusted. Typically, regeneration is accomplished by raising the temperature of the PM filter above a regeneration temperature. At temperatures above the regeneration temperature, PM accumulated within the PM filter will begin to combust. The temperature of the PM filter is held above the regeneration temperature for a period until a desired amount of the PM is combusted.

SUMMARY

In one form, the present disclosure provides a control system for an engine that includes an exhaust module and a combustion module. The exhaust module supplies a first mass airflow (MAF) to exhaust produced by the engine upstream of a catalytic converter during regeneration of a PM filter located downstream of the catalytic converter. The combustion module, during the regeneration, supplies a first amount of fuel to a cylinder during an intake stroke based on the first MAF and a second MAF to the cylinder during the intake stroke. The combustion module, during the regeneration, further supplies a second amount of fuel to the cylinder during a subsequent intake stroke based on a first air-to-fuel (A/F) ratio of the cylinder and an oxygen content of the exhaust downstream of the catalytic converter.

In one feature, the combustion module further supplies the first amount of fuel based on a desired amount of exhaust constituents of the exhaust upstream of the catalytic converter. The exhaust constituents include at least one of hydrocarbons and carbon monoxide. In another feature, the combustion module further supplies the first amount of fuel based on a desired A/F ratio of the exhaust upstream of the catalytic converter.

In further features, the exhaust module begins supplying the first MAF after the intake stroke and before the subsequent intake stroke. In still further features, the first MAF is based on a temperature of the PM filter. In related features, the exhaust module supplies the first MAF by operating an air pump in fluid communication with the exhaust. In other related features, the first MAF is supplied to an exhaust port of the cylinder.

In still further features, the exhaust module selectively supplies a third MAF to the exhaust between the catalytic converter and the PM filter. In related features, the third MAF is based on a temperature of the PM filter. In yet further features, the fuel is gasoline.

In another form, the present disclosure provides a method for controlling an engine that includes supplying a first MAF to exhaust produced by the engine upstream of a catalytic converter during regeneration of a PM filter located downstream of the catalytic converter. The method further includes supplying, during the regeneration, a first amount of fuel to a cylinder during an intake stroke, and supplying, during the regeneration, a second amount of fuel to the cylinder during a subsequent intake stroke. The first amount of fuel is based on the first MAF and a second MAF to the cylinder during the intake stroke. The second amount of fuel is based on a first A/F ratio of the cylinder and an oxygen content of the exhaust downstream of the catalytic converter.

In one feature, the first amount of fuel is based on a desired amount of exhaust constituents of the exhaust upstream of the catalytic converter. The exhaust constituents include at least one of hydrocarbons and carbon monoxide. In another feature, the first amount of fuel is further based on a desired A/F ratio of the exhaust upstream of the catalytic converter.

In further features, the supplying the first MAF begins after the supplying the first amount of fuel and before the supplying the second amount of fuel. In still further features, the first MAF is based on a temperature of the PM filter. In related features, the first MAF is supplied by operating an air pump in fluid communication with the exhaust. In other related features, the first MAF is supplied to an exhaust port of the cylinder.

In still further features, the method further includes selectively supplying a third MAF to the exhaust between the catalytic converter and the PM filter. In related features, the third MAF is based on a temperature of the PM filter. In yet further features, the fuel is gasoline.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
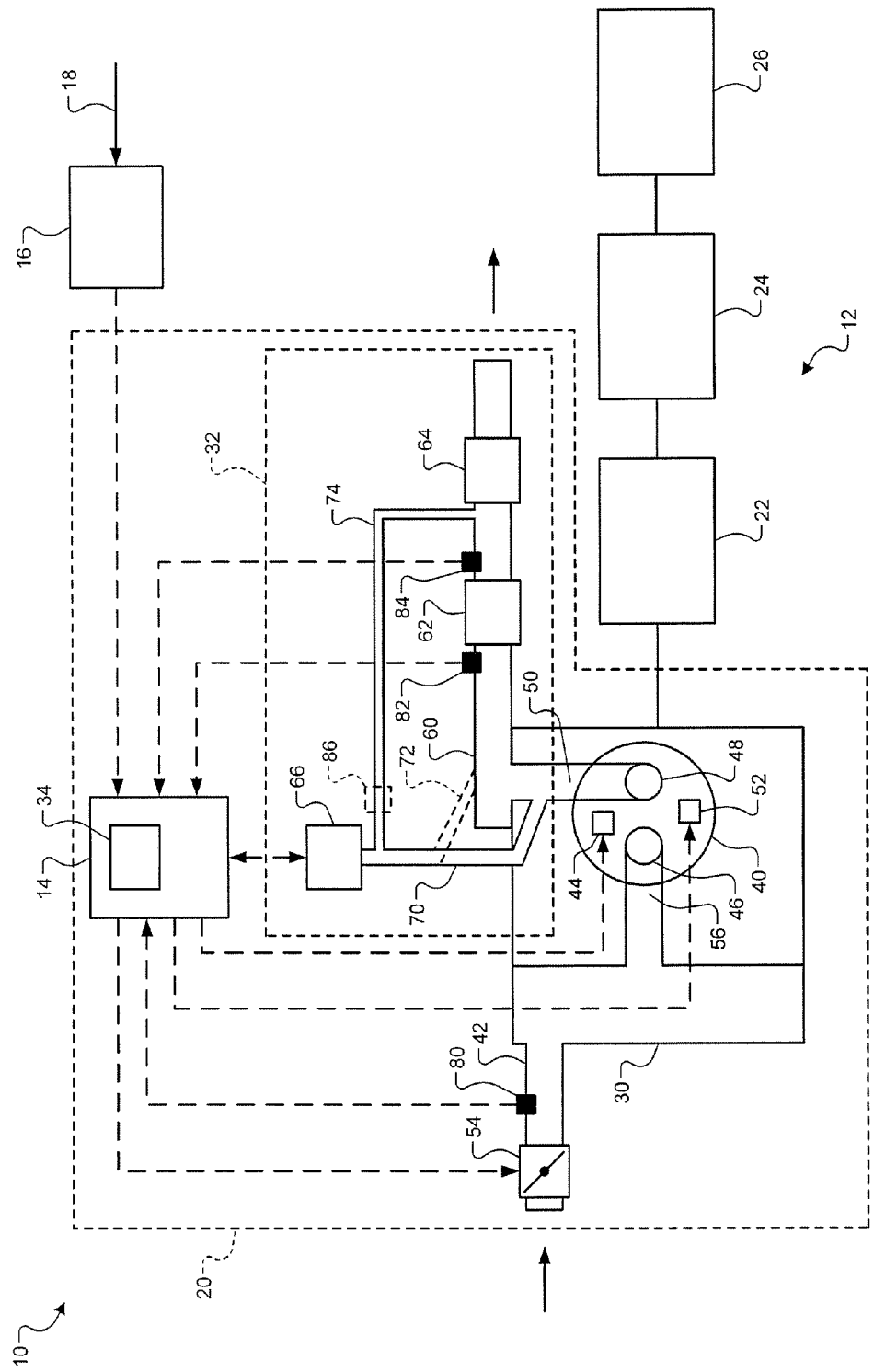
FIG. 1 is a functional block diagram of an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The control system and method of the present disclosure utilizes a catalytic converter located upstream of the PM filter to combust increased amounts of HC and CO in the exhaust produced by combustion in the engine. Combustion of the increased amounts of HC and CO by the catalytic converter generates heat that increases the temperature of the PM filter above its regeneration temperature and initiates regeneration. Continued combustion of the increased amounts of HC and CO generates heat that sustains regeneration.

The control system includes an exhaust module and a combustion module. The exhaust module supplies secondary air to the exhaust upstream of the catalytic converter using a secondary air pump. The combustion module supplies fuel to a combustion chamber of the engine (e.g., cylinder) based on a first MAF rate of intake air entering the combustion chamber and a second MAF rate of the secondary air supplied to the exhaust. By accounting for the MAF rates of intake air and secondary air, the combustion module creates a rich A/F mixture that is combusted in the combustion chamber and thereby increases the amount of HC and CO produced in the exhaust.

Together, the combustion module and the exhaust module control the timing of supplying the rich A/F mixture and supplying the secondary air to introduce the increased amounts of HC and CO and the secondary air in the exhaust at around the same time. The HC and CO and the secondary air mix, forming an exhaust mixture that is combusted within the catalytic converter.

Initially, during an open-loop fuel control period, the combustion module supplies fuel to the engine to provide the A/F mixture at a predetermined in-chamber A/F ratio less than a first stoichiometric A/F ratio of the fuel. Subsequently, during a closed-loop control period, the combustion module adjusts the in-catalyst A/F ratio of the exhaust mixture entering the catalytic converter at or near a second stoichiometric A/F ratio of the exhaust mixture. The combustion module adjusts the in-chamber A/F ratio based on a post-catalyst oxygen content of the exhaust downstream of the catalytic converter. The post-catalyst oxygen content is measured by an oxygen sensor located downstream of the catalytic converter.

Typically, an exhaust treatment system of the engine includes a catalytic converter and an oxygen sensor located downstream of the catalytic converter. Thus, the control system and method of the present disclosure provides a low-cost system for regenerating a PM filter by utilizing existing hardware. The control system and method control the timing of the rich A/F mixture and the secondary air supplied to the exhaust. The control system and method also implement closed-loop control of the in-cylinder A/F ratio to maintain the in-catalyst A/F ratio of the exhaust mixture entering the catalytic converter at a stoichiometric A/F ratio. In this way, the control system and method provide for regeneration of the PM filter with minimal impact on exhaust emissions.

With particular reference to FIG. 1, an exemplary vehicle 10 according to the present disclosure is presented. The vehicle 10 includes a powertrain 12, a control module 14, and driver interface devices 16. Generally, the powertrain 12 produces drive torque and propels the vehicle 10. The control module 14 controls operation of the powertrain 12, including the drive torque produced. The control module 14 may include one or more control modules that control operation of the various components of the powertrain 12 as discussed in more detail below.

The control module 14 controls operation based on various inputs, including driver signals output by the driver interface devices 16 and various other vehicle system signals and control values according to the present disclosure. The driver interface devices 16 output the driver signals in response to driver inputs 18 made by the driver. The driver inputs 18 may include, but are not limited to, manipulating an accelerator pedal, a brake pedal, and a steering wheel. The vehicle system signals include, but are not limited to, signals output by sensors that sense various vehicle operating conditions, and control signals generated by various modules of the vehicle 10.

The powertrain 12 includes an engine system 20, a transmission 22, and a driveline 24. The engine system 20 produces the drive torque, which is transmitted to the transmission 22. Drive torque input to the transmission 22 is transmitted at one or more gear ratios to the driveline 26, which drives one or more wheels 26 of the vehicle 10. The present disclosure is not limited to particular types of transmissions or drivelines. For example, the transmission 22 may be an automatic transmission or a manual transmission. The driveline 24 may be configured to drive one or more front and/or rear wheels 26 of the vehicle 10.

The engine system 20 includes an internal combustion engine (ICE) 30, an exhaust system 32, and an engine control module (ECM) 34. The engine system 20 may be a hybrid engine system including an electric motor (not shown) that produces drive torque used alone, or in combination with, the drive torque produced by the ICE 30 to propel the vehicle 10. The present disclosure is not limited to internal combustion engines of a particular type or configuration. For example, the ICE 30 may be a spark-ignition (SI) engine or a compression-ignition (CI) engine. The ICE 30 may be a four-stroke engine or a two-stroke engine. For exemplary purposes, the ICE 30 is presented as a four-stroke, reciprocating-type SI gasoline engine having a single cylinder. While a single cylinder is presented for simplicity, it will be appreciated that the ICE 30 may have multiple cylinders.

The ICE 30 includes a cylinder 40, an intake system 42, a fuel system including a fuel injector 44, a valve train including an intake valve 46 and an exhaust valve 48, and an exhaust port 50. The ICE 30 further includes an ignition system including a spark plug 52. The intake system 42 includes a throttle 54 and an intake port 56. The present disclosure is not limited intake systems, fuel systems, or valve trains of a particular type. For exemplary purposes, the fuel system presented is a direct-injection type fuel system and the fuel injector 44 dispenses fuel directly into the cylinder 40. The valve train may be an overhead cam valve train and may include multiple intake and/or exhaust valves. For simplicity, the valve train presented includes a single intake valve 46 and exhaust valve 48.

During operation of the ICE 30, air is drawn into the cylinder 40 through the throttle 54 and the intake port 56 and mixes with fuel supplied by the fuel injector 44. The air is drawn into the cylinder 40 during an intake stroke of a piston (not shown) disposed in the cylinder 40 as the piston moves from a top-dead-center (TDC) position to a bottom-dead-center (BDC) position. In the TDC position, a first volume of the cylinder 40 is at a minimum. In the BDC position, a second volume of the cylinder 40 is at a maximum.

The mixture of air and fuel (i.e., A/F mixture) is compressed and subsequently combusted within the cylinder 40. The A/F mixture is compressed by the piston during a compression stroke as the piston moves from the BDC position to the TDC position. Combustion of the A/F mixture is initiated by a spark supplied by the spark plug 52. The A/F mixture is combusted and drives the piston during a power stroke as the piston moves from the TDC position to the BDC position. Exhaust produced by combustion is expelled from the cylinder 40 into the exhaust port 50. The exhaust is expelled during an exhaust stroke as the piston moves from the BDC position to the TDC position.

The MAF rate and amount of air entering the ICE 30 is controlled via the throttle 54. The timing and amount of fuel entering the cylinder 40 is controlled via the fuel injector 44. The timing of the initiation of combustion is controlled via the spark plug 52. The timing of the air entering the cylinder 40 and the exhaust expelled from the cylinder 40 is controlled via the intake valve 46 and the exhaust valve 48, respectively.

The exhaust system 32 receives exhaust produced by the ICE 30 and treats the exhaust to reduce concentrations of various gases in the exhaust. According to the present disclosure, the exhaust system 32 further treats the exhaust to reduce PM in the exhaust. The exhaust system 32 includes an exhaust manifold 60, a catalytic converter 62, a PM filter 64, and a secondary air pump (SAP) 66 interconnected by exhaust piping. The exhaust manifold 60 receives exhaust from the exhaust port 50 and may be mounted to the ICE 30.

The catalytic converter 62 is disposed upstream of the PM filter 64 and reduces the concentrations of various gases in the exhaust. The present disclosure is not limited to a catalytic converter of a particular type. For example, the catalytic converter 62 may be a two-way type catalytic converter that oxidizes HC to carbon dioxide ($CO_2$) and water ($H_2O$) and oxidizes CO to $CO_2$. Alternatively, the catalytic converter 62 may be a three-way type catalytic converter that oxidizes HC and CO, and reduces $NO_X$ to nitrogen ($N_2$) and oxygen ($O_2$).

The PM filter 64 filters PM from the exhaust exiting the catalytic converter 62 and generally is of the wall-flow type. The present disclosure is not limited to wall-flow PM filters of a particular construction or wall-flow PM filters composed of a particular material. For example, the PM filter 64 may include an alternating arrangement of inlet and outlet channels separated by walls formed of either cordierite or silicon carbide. In this construction, exhaust enters the PM filter 64 through the inlet channels, passes through the walls into the outlet channels, and leaves via the outlet channels. PM in the exhaust is trapped by and accumulates on the walls. Accumulated PM reduces flow through the PM filter 64 and is periodically removed during a regeneration process according to the present disclosure.

The SAP 66 selectively supplies secondary air from the surroundings to the exhaust that is used to combust increased amounts of HC in the exhaust and oxidize increased amounts of CO. More specifically, when operated, the SAP 66 draws air from the surroundings and supplies the air under pressure to the exhaust. According to the present disclosure, the SAP 66 is electrically operated and selectively supplies secondary air to the exhaust upstream of the catalytic converter 62 based on control signals received from the ECM 34. The SAP 66 is operated to support combustion of increased amounts of HC and CO that results from a rich A/F mixture supplied to the cylinder 40. A MAF rate and amount of the secondary air output by the SAP 66 may be varied by modulating the power supplied to the SAP 66.

In various implementations, the SAP 66 may supply secondary air directly to the exhaust port 50 and/or directly to the exhaust manifold 60. In the present example, the SAP 66 supplies secondary air directly to the exhaust port 50 via piping 70 fluidly coupling the SAP 66 with the exhaust port 50. In an alternate implementation, the SAP 66 may supply secondary air directly to the exhaust manifold via piping 72. One advantage to supplying secondary air directly to the exhaust port 50 is that a portion of the HC, when mixed with the fresh air in the presence of the hot exhaust valve 48, may combust and thereby generate heat.

According to the present disclosure, the SAP 66 also selectively supplies secondary air to the exhaust entering the PM filter 64 from the catalytic converter 62 during regeneration to support combustion of the PM. The SAP 66 supplies the air to the PM filter 64 via piping 74 fluidly coupling the SAP 66 with exhaust piping located at an inlet of the PM filter 64. In various implementations, the piping 72 and the piping 74 may be sized to provide predetermined MAF rates through the piping 72, 74. The MAF rates may be predetermined based on desired MAF rates to the catalytic converter 62 and the PM filter 64 during regeneration. In various implementations, a flow control valve 86 may be used to control the MAF rate through the piping 74.

Generally, a desired MAF rate of secondary air to the catalytic converter 62 to support combustion of the HC and CO will be greater than a desired MAF rate of secondary air to the PM filter 64 to support combustion of the PM. Accordingly, the piping 74 may have a smaller inside diameter than that of the piping 72. In various implementations, the piping 74 may have a first MAF rate less than twenty percent, and more particularly around ten percent, of a second MAF rate through the piping 72.

The ECM 34 controls operation of the various components of the engine system 20, including the ICE 30 and the exhaust system 32. The ECM 34 controls operation by generating timed control signals used to control operation of the various components. The ECM 34 generates the timed control signals based on various inputs, including the driver signals and the vehicle system signals.

For purposes of the present disclosure, the control signals controlling operation of the engine system 20 will be referred to collectively as "engine system control signals". According to the present example, the engine system control signals may include a throttle control signal output to the throttle 54, a fuel control signal output to the fuel injector 44, a spark control signal output to the spark plug 52, and/or an SAP control signal output to the SAP 66. The throttle control signal controls the throttle 54 and thereby controls a MAF rate of air through the throttle 54. The fuel control signal controls the fuel injector 44 and thereby controls the timing and amount (e.g., mass) of fuel supplied by the fuel system. The spark control signal controls operation of the spark plug 52 and thereby controls the timing of the spark supplied by the ignition system. The SAP control signal controls operation of the SAP 66 and thereby controls the timing, MAF rate, and amount of secondary air supplied to the exhaust system 32.

The ECM 34 controls the drive torque produced by the ICE 30 by controlling the amount of air and fuel supplied to the cylinder 40. Generally, the ECM 34 maintains an A/F ratio of the A/F mixture in the cylinder 40 at or near a stoichiometric A/F ratio, which for gasoline is around 14.7:1. In various implementations, the ECM 34 may determine the amount of fuel based on a mass flow rate of air entering the ICE 30. A MAF sensor 80 located in the intake system 42 downstream of the throttle 54 may sense the mass flow rate and output a signal based on the mass flow rate sensed.

The ECM 34 may also implement closed-loop control of the in-cylinder A/F ratio and adjust the amount of fuel supplied based on an oxygen content of the exhaust exiting the cylinder 40. In the present example, a pre-catalyst oxygen sensor 82 is located upstream of the catalytic converter 62 and senses the oxygen content of the exhaust exiting the cylinder 40. The pre-catalyst oxygen sensor 82 generates a signal indicative of the pre-catalyst oxygen content sensed. During periods when the PM filter 64 is not being generated, the ECM 34 adjusts the amount of fuel supplied based on the pre-catalyst oxygen content.

According to the present disclosure, the ECM 34 also determines whether to regenerate the PM filter 64. When regeneration is desired, the ECM 34 initially lowers the in-cylinder A/F ratio to a predetermined in-cylinder A/F ratio less than the stoichiometric A/F ratio. The ECM 34 lowers the in-cylinder A/F ratio to begin supplying a rich A/F mixture and thereby increase the amount of HC and CO in the exhaust entering the catalytic converter 62. The predetermined in-cylinder A/F ratio may be around 14.5:1. Additionally, the ECM 34 supplies secondary air to the exhaust by operating the SAP 66. The ECM 34 adjusts the in-cylinder A/F ratio to maintain an A/F ratio of the exhaust mixture entering the catalytic converter 62 at a predetermined in-catalyst A/F ratio at or near a stoichiometric A/F ratio of the exhaust mixture.

The ECM 34 implements closed-loop control of the in-cylinder A/F ratio based on an oxygen content of the exhaust exiting the catalytic converter 62. The ECM 34 adjusts the in-cylinder A/F ratio by adjusting the amount of fuel supplied and thereby maintains the in-catalyst A/F ratio at or near the stoichiometric A/F ratio of the exhaust mixture. More specifically, the ECM 34 supplies a first mass of fuel during a current intake stroke based on a second mass of said fuel supplied during a previous intake stroke and the oxygen content of the exhaust exiting the catalytic converter 62. In the present example, a post-catalyst oxygen sensor 84 is located downstream of the catalytic converter 62 and senses the oxygen content of the exhaust exiting the catalytic converter 62. The post-catalyst oxygen sensor 84 generates a signal indicative of the post-catalyst oxygen content sensed.

Figure 2:
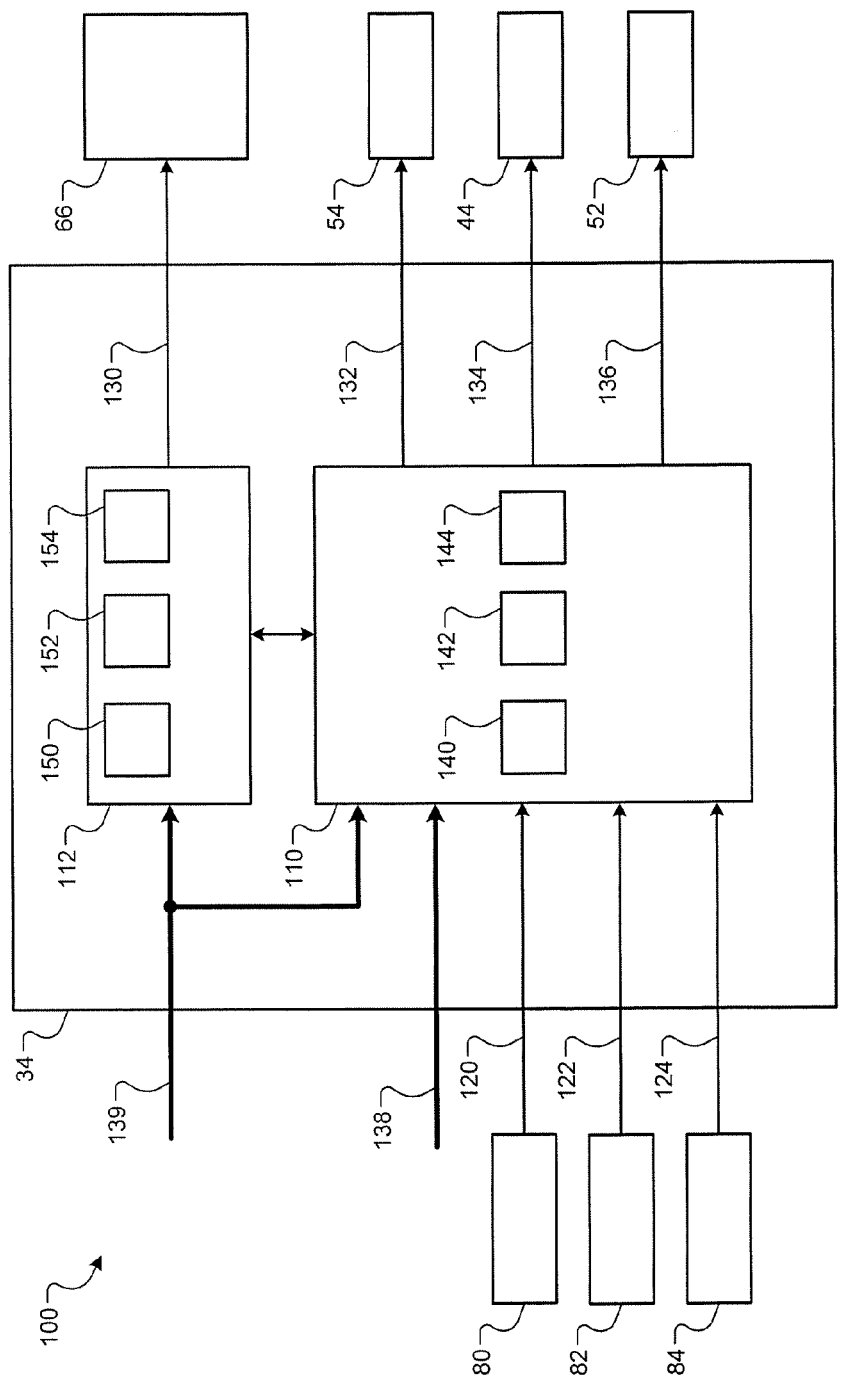
FIG. 2 is a functional block diagram of an exemplary implementation of the control module shown in FIG. 1 in an exemplary control system according to the present disclosure.

With particular reference to FIG. 2, an exemplary implementation of the ECM 34 in a control system 100 according to the present disclosure is presented. The ECM 34 includes a combustion module 110 and an exhaust module 112. The combustion module 110 and the exhaust module 112 generate various engine system control signals based on various inputs received and control parameters according to the present disclosure.

In FIG. 2, signals output by the MAF sensor 80, the pre-catalyst oxygen sensor 82, and the post-catalyst oxygen sensor 84 are designated by reference numerals 120, reference numeral 122, and reference numeral 124, respectively. The SAP control signal, the throttle control signal, the fuel control signal, and the spark control signal are designated by reference numeral 130, reference numeral 132, reference numeral 134, and reference numeral 136, respectively. The driver signals are designated by reference numeral 138. Other vehicle system signals, including other engine system control signals, are designated by reference numeral 139.

The combustion module 110 generates the fuel control signal 132, the throttle control signal 134, and the spark control signal 136 during operation of the engine system 20. The combustion module 110 may include one or more control modules for generating the various control signals. In the present example, the combustion module 110 includes an air module (AM) 140, a fuel module (FM) 142, and a spark module (SM) 144.

The AM 140 generates the throttle control signal 132 and thereby controls the MAF rate of air through the throttle 54 and into the cylinder 40. The AM 140 generates the throttle control signal 132 based on various inputs, including the driver signals and an estimated MAF rate for producing a desired drive torque by the ICE 30.

The FM 142 generates the fuel control signal 134 and thereby controls the quantity and timing of the fuel supplied to the cylinder 40 by the fuel injector 44 during each combustion cycle. The FM 142 generates the fuel control signal 134 based on inputs including the current MAF rate, the desired in-cylinder A/F ratio, the desired in-catalyst A/F ratio, and the pre and post-catalyst oxygen content. The FM 142 may adjust the timing of a period of fuel injection by the fuel injector 44 to achieve a desired end of fuel injection timing. More specifically, the FM 142 may adjust the timing of a beginning of the fuel injection period to end the fuel injection period a predetermined period prior to a spark supplied by the spark plug 52.

The SM 144 generates the spark control signal 136 and thereby controls the timing of the spark supplied by the spark plug 52 during each compression stroke. The SM 144 generates the spark control signal based on inputs including, but not limited to, the desired drive torque.

The exhaust module 112 generates the SAP control signal 130 and determines whether regeneration of the PM filter 64 should be performed. The exhaust module 112 may also estimate the temperature of the PM filter 64. The exhaust module 112 communicates with the combustion module 110 and works together with the combustion module 110 to regenerate the PM filter 64 by controlling combustion within the catalytic converter 62. The exhaust module 112 may include one or more modules for generating the various control signals. In the present example, the exhaust module 112 includes a regeneration module (RM) 150, a secondary air module (SAM) 152, and a temperature module (TM) 154.

The RM 150 determines whether regeneration of the PM filter 64 should be performed and when regeneration is to be performed, instructs the various modules of the ECM 34 when to begin and end regeneration. The present disclosure is not limited to particular methods for determining whether regeneration should be performed and when to begin and end regeneration. For example, the RM 150 may determine whether regeneration should be performed based on control parameters including, but not limited to a pressure drop across the PM filter 64 and/or an elapsed time since the PM filter 64 was last regenerated. The RM 150 may end regeneration when an elapsed time the PM filter 64 has operated above its regeneration temperature exceeds a predetermined period.

The SAM 152 generates the SAP control signal and thereby controls the timing, MAF rate, and amount of secondary air supplied to the exhaust. The SAM 152 may generate the SAP control signal based on various inputs including, but not limited to, the instructions generated by the RM 150 and an estimated temperature of the PM filter 64. The SAM 152 may vary the MAF rate and amount of secondary air supplied to the exhaust by modulating the power supplied to the SAP 66.

The TM 154 estimates the temperature of the PM filter 64. Generally, the present disclosure is not limited to a particular method for estimating the temperature of the PM filter 64. For example, the TM 154 may estimate the temperature of the PM filter 64 based on a temperature sensed by a temperature sensor coupled to the PM filter 64 and/or based on a rotational speed of the engine and an estimated engine torque output. According to the present disclosure, the TM 154 may further estimate the temperature based on the MAF rate of secondary air supplied by the SAP 66 and the post-catalyst oxygen content during regeneration.

Figure 3:
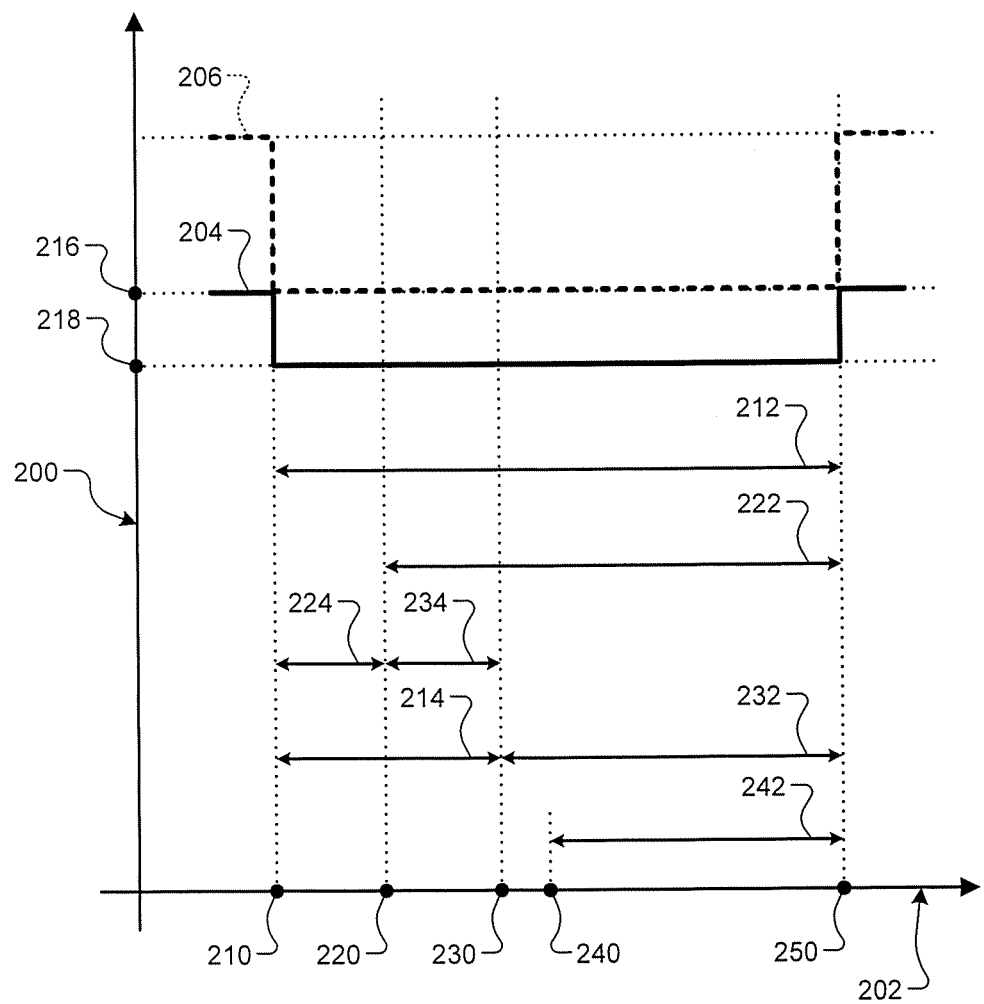
FIG. 3 is a chart illustrating various control periods and control parameters during regeneration of a PM filter according to the present disclosure.

With particular reference to FIG. 3, operation of the control system 100 and, more particularly, the ECM 34 according to the present disclosure will now be described in further detail. FIG. 3 is a chart of A/F ratio along a vertical axis 200 versus time along a horizontal axis 202. FIG. 3 includes a first plot of the in-cylinder A/F ratio designated by reference numeral 204 and a second plot of the in-catalyst A/F ratio designated by reference numeral by reference numeral 206.

At time 210, the exhaust module 112 determines the PM filter 64 should be regenerated and instructs the combustion module 110 to initiate regeneration. Beginning at time 210, in response to the instruction, the combustion module 110 begins a rich A/F mixture period 212 during which the combustion module 110 supplies a rich A/F mixture to the cylinder 40. The combustion module 110 begins the rich A/F mixture period 212 with an open-loop fuel control period 214. During the open-loop fuel control period 214, the combustion module 110 lowers the in-cylinder A/F ratio to the predetermined in-cylinder A/F ratio.

The combustion module 110 lowers the in-cylinder A/F ratio to increase the combined amount of HC and CO in the exhaust to a desired mass. Generally, the desired mass is a combined mass of HC and CO that when combined with a mass of secondary air in the exhaust results in an in-catalyst A/F mixture at or near the stoichiometric A/F ratio of the exhaust mixture.

In the present example, the combustion module 110 lowers the in-cylinder A/F ratio by increasing the mass of fuel supplied during the intake stroke. The combustion module 110 may supply additional fuel during the exhaust stroke to increase the amount of HC and CO in the exhaust to the desired mass. Additional fuel may be supplied during the exhaust stroke to avoid undesirably low in-cylinder A/F ratios that may otherwise result in an undesirable impact on engine performance.

The stoichiometric A/F ratio is designated by point 216 and the predetermined in-cylinder A/F ratio is designated by point 218. Generally, the in-cylinder A/F ratio may be at or near the stoichiometric A/F ratio prior to time 210 as shown. However, it will be appreciated that the in-cylinder A/F ratio may be greater than or less then the stoichiometric A/F ratio, depending on the operating conditions. For example, the in-cylinder A/F ratio may be less than the stoichiometric A/F ratio during periods of vehicle acceleration. The in-cylinder A/F ratio may be greater than the stoichiometric A/F ratio during periods of vehicle deceleration and coast down.

At time 220 the exhaust module 112 begins a period 222 of supplying secondary air to the exhaust for combusting the increased mass of HC and CO in the catalytic converter 62. During the air supply period 222, the exhaust module 112 supplies air by operating the SAP 66. In the present example, the exhaust module 112 begins supplying secondary air to the exhaust a predetermined period 224 after the in-cylinder A/F ratio is lowered at time 210. The period 224 corresponds to an estimated delay between the time the in-cylinder A/F ratio is lowered and the time the increased HC and CO reaches the location in the exhaust system 32 where the SAP 66 supplies the secondary air. The period 224 accounts for combustion cycle delays associated with completing the intake, compression, and exhaust strokes and transport delays associated with exhaust flow in the exhaust port 50 and/or the exhaust system 32.

During the air supply period 222, the exhaust module 112 may vary the MAF rate of secondary air supplied based on the estimated temperature of the PM filter 64. For example, the MAF rate of secondary air may be increased to increase the temperature of the PM filter 64. The MAF rate of secondary air may by decreased to reduce the temperature of the PM filter 64 and avoid overheating the PM filter and/or uncontrolled PM combustion.

When varying the MAF rate of secondary air supplied based on the estimated temperature of the PM filter 64, the exhaust module 112 may selectively vary the MAF rates of secondary air supplied via the piping 70 and/or the piping 74. For example, the exhaust module 112 may increase or decrease the MAF rate of secondary air supplied via the piping 70 to increase or decrease, respectively, the rate at which heat is produced by combustion within the catalytic converter 62. The exhaust module 112 may increase or decrease the MAF rate of secondary air supplied via the piping 74 to increase or decrease, respectively, the rate of PM combustion within the PM filter 64.

Beginning at time 220, the combustion module 110 begins supplying fuel based on the current MAF rate of intake air entering the ICE 30 and an estimated MAF rate of secondary air supplied to the exhaust by the SAP 66. More specifically, the combustion module 110 supplies an amount of fuel required to maintain the combined mass of HC and CO generated in the exhaust at the desired mass. Based on the amount of fuel required, the combustion module 110 may supply a first portion of the required fuel during the intake stroke and a second portion of the required fuel during the exhaust stroke.

At time 230, the combustion module 110 ends the open-loop fuel control period 214 and begins a period 232 of closed-loop fuel control. The combustion module 110 begins the closed-loop fuel control period 232 a predetermined period 234 after beginning to supply secondary air at time 220. The period 234 accounts for an expected delay in the post-catalyst oxygen sensor 84 sensing changes in the post-catalyst oxygen content due to the combustion of the increased amounts of HC and CO by the catalytic converter 62.

During the closed-loop fuel control period 232, the combustion module 110 adjusts the in-cylinder A/F ratio based on the post-catalyst oxygen content. In this way, the combustion module 110 maintains the in-catalyst A/F ratio at or near the stoichiometric A/F ratio of the exhaust mixture. The combustion module 110 adjusts the in-cylinder A/F ratio by adjusting the amount of fuel supplied. More specifically, control supplies a first mass of fuel during a current intake stroke based on a second mass of said fuel supplied during a previous intake stroke and the post-catalyst oxygen content. Based on the adjusted in-cylinder A/F ratio, the combustion module may further adjust the amount of fuel supplied during the intake stroke and/or exhaust stroke.

Regeneration of the PM filter 64 begins at time 240. Regeneration begins when heat produced by the combustion of the increased amounts of HC and CO by the catalytic converter 62 increases the temperature of the PM filter 64 above its regeneration temperature. Generally, the open-loop fuel control period 214 will be relatively short and regeneration will begin during the closed-loop fuel control period 232. However, it will be appreciated that in various implementations, regeneration may begin during the open-loop fuel control period 214. Regeneration continues for a period 242 until, at time 250, the exhaust module 112 determines regeneration should end and instructs the combustion module 110 to end regeneration. In response to the instruction at time 250, the combustion module 110 ends the rich A/F period and resumes normal control of the in-cylinder A/F ratio.

Figure 4:
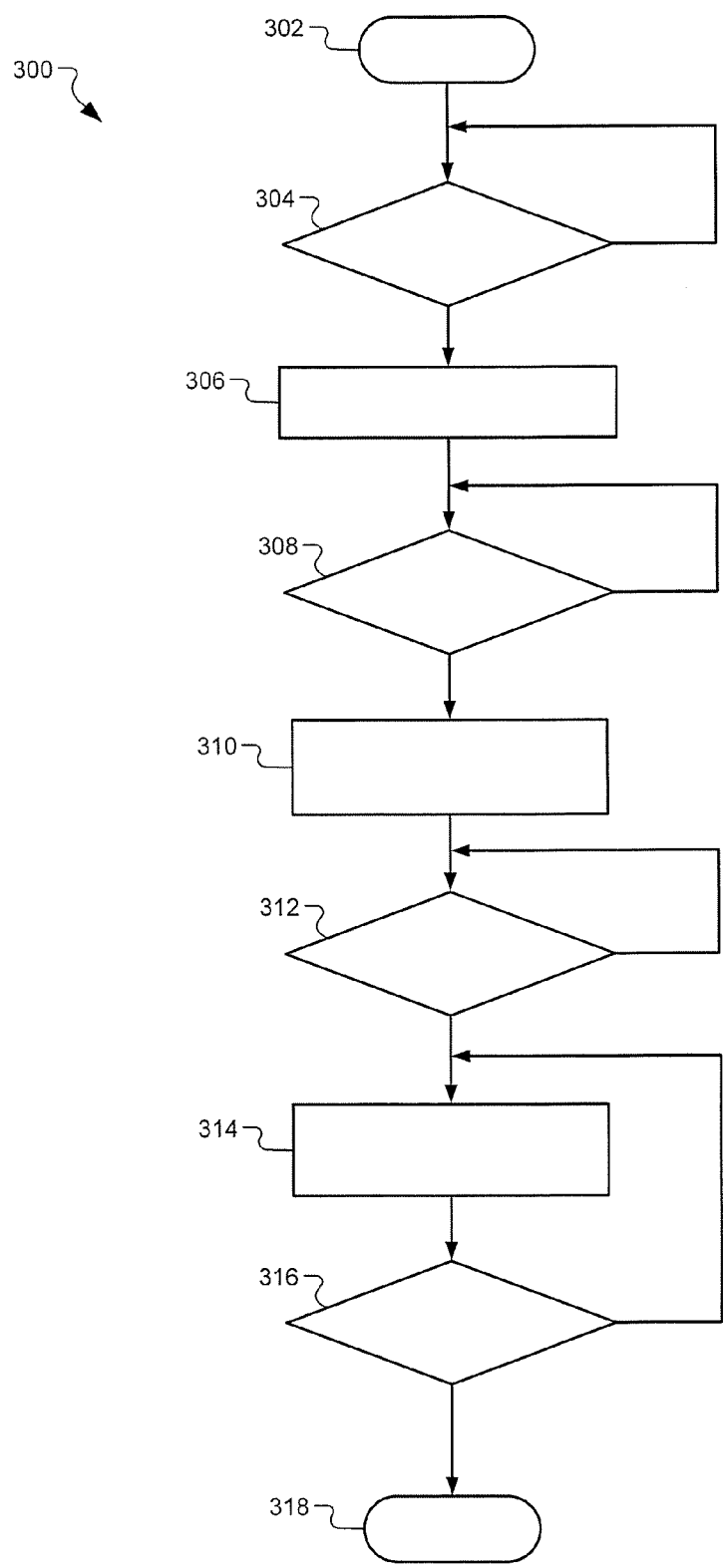
FIG. 4 is a flow chart illustrating an exemplary method for controlling an engine to regenerate a PM filter according to the present disclosure.

With particular reference to FIG. 4, an exemplary method 300 for controlling an engine to regenerate a PM filter according to the present disclosure is presented. The method 300 may be implemented in one or more control modules of an engine control system, such as the engine control system 100. The method 300 may be run periodically during operation of the engine. A start of the method 300 is designated at 302. Control according to the method 300 begins at 304 where control determines whether to regenerate the PM filter. If yes, then control proceeds at 306, otherwise control loops back as shown.

At 306, control begins supplying a rich A/F mixture to a combustion chamber (e.g., cylinder) of the engine, beginning a rich A/F mixture period. During the rich A/F mixture period, control lowers an A/F ratio of the combustion chamber by increasing an amount of fuel supplied to the combustion chamber for combustion. Control lowers the A/F ratio of the combustion chamber to a predetermined in-chamber A/F ratio less than a stoichiometric A/F ratio of the fuel combusted by the engine. The in-chamber A/F ratio is based on a desired combined mass of HC and CO produced by combustion of the fuel and an estimated mass of secondary air supplied to the exhaust according to the method 300.

Control proceeds at 308 where control determines whether to begin supplying the secondary air to the exhaust upstream of a catalytic converter. If yes, control proceeds at 310, otherwise control loops back as shown. In various implementations, control may wait a predetermined period after beginning to supply the rich A/F mixture at 306 before proceeding at 310. In other implementations, control may proceed at 310 at the same time the rich A/F mixture period begins at 306.

At 310, control begins supplying the secondary air to the exhaust upstream of the catalytic converter, beginning a secondary air supply period. During the secondary air supply period, control may increase the MAF rate of secondary air supplied to increase the rate at which heat is generated by combustion of the HC and CO in the catalytic converter. Control may also lower the MAF rate of secondary air supplied to decrease the rate at which heat is generated by combustion to avoid overheating the PM filter and/or uncontrolled combustion of PM within the PM filter.

At 312, control determines whether to end the open-loop control period and begin a closed-loop control period of controlling the in-chamber A/F ratio. If yes, then control proceeds at 314, otherwise control loops back as shown.

At 314, control begins adjusting the in-cylinder A/F ratio by adjusting the amount of fuel supplied to the combustion chamber based on a post-catalyst oxygen content of the exhaust. By adjusting the amount of fuel supplied based on the post-oxygen content, control maintains a ratio of the mass of air to the combined mass of HO and CO in the exhaust at or near a stoichiometric A/F ratio of the exhaust mixture.

At 316, control determines whether to end regeneration of the PM filter. If yes, then control according to the method 300 ends, otherwise control loops back as shown. An end of the method is designated at 318.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
a first electronic circuit configured to, during regeneration of a particulate matter (PM) filter located downstream of a catalytic converter, control supply of a first mass airflow (MAF) to exhaust produced by said engine upstream of said catalytic converter; and
a second electronic circuit configured to, during said regeneration:
control supply of a first amount of fuel to a cylinder during an intake stroke based on said first MAF and a second MAF to said cylinder during said intake stroke; and
control supply of a second amount of fuel to said cylinder during a subsequent intake stroke based on a first air-to-fuel (A/F) ratio of said cylinder and an oxygen content of said exhaust downstream of said catalytic converter.

2. The control system of claim 1, wherein said second electronic circuit is further configured to control supply of said first amount of fuel based on a desired amount of exhaust constituents of said exhaust upstream of said catalytic converter, said exhaust constituents including at least one of hydrocarbons and carbon monoxide.

3. The control system of claim 1, wherein said second electronic circuit is further configured to control supply of said first amount of fuel based on a desired A/F ratio of said exhaust upstream of said catalytic converter.

4. The control system of claim 1, wherein said first electronic circuit is configured to control beginning of supplying said first MAF after said intake stroke and before said subsequent intake stroke.

5. The control system of claim 1, wherein said first MAF is based on a temperature of said PM filter.

6. The control system of claim 1, wherein said first electronic circuit is configured to control supply of said first MAF by operating an air pump in fluid communication with said exhaust.

7. The control system of claim 1, wherein said first MAF is supplied to an exhaust port of said cylinder.

8. The control system of claim 1, wherein said first electronic circuit is configured to selectively control supply of a third MAF to said exhaust between said catalytic converter and said PM filter.

9. The control system of claim 8, wherein said third MAF is based on a temperature of said PM filter.

10. The control system of claim 1, wherein said fuel is gasoline.

11. The control system of claim 1, wherein at least one of an Application Specific Integrated Circuit (ASIC), a processor and memory that execute one or more software or firmware programs, and a combinational logic circuit includes at least one of the first electronic circuit and the second electronic circuit.

12. A method for controlling an engine, comprising:
supplying a first mass airflow (MAF) to exhaust produced by said engine upstream of a catalytic converter during regeneration of a particulate matter (PM) filter located downstream of said catalytic converter;
supplying, during said regeneration, a first amount of fuel to a cylinder during an intake stroke based on said first MAF and a second MAF to said cylinder during said intake stroke; and
supplying, during said regeneration, a second amount of fuel to said cylinder during a subsequent intake stroke based on a first air-to-fuel (A/F) ratio of said cylinder and an oxygen content of said exhaust downstream of said catalytic converter.

13. The method of claim 12, wherein said first amount of fuel is based on a desired amount of exhaust constituents of said exhaust upstream of said catalytic converter and said exhaust constituents include at least one of hydrocarbons and carbon monoxide.

14. The method of claim 12, wherein said first amount of fuel is further based on a desired A/F ratio of said exhaust upstream of said catalytic converter.

15. The method of claim 12, wherein said supplying said first MAF begins after said supplying said first amount of fuel and before said supplying said second amount of fuel.

16. The method of claim 12, wherein said first MAF is based on a temperature of said PM filter.

17. The method of claim 12, wherein said first MAF is supplied by operating an air pump in fluid communication with said exhaust.

18. The method of claim 12, wherein said first MAF is supplied to an exhaust port of said cylinder.

19. The method of claim 12, further comprising selectively supplying a third MAF to said exhaust between said catalytic converter and said PM filter.

20. The method of claim 19, wherein said third MAF is based on a temperature of said PM filter.

21. The method of claim 12, wherein said fuel is gasoline.

* * * * *